Dec. 29, 1964  A. S. VAIL  3,163,440
EXTENDED SWING RADIUS AUTOMOTIVE REAR AXLE SUSPENSION SYSTEM
Filed Oct. 3, 1962  2 Sheets-Sheet 1
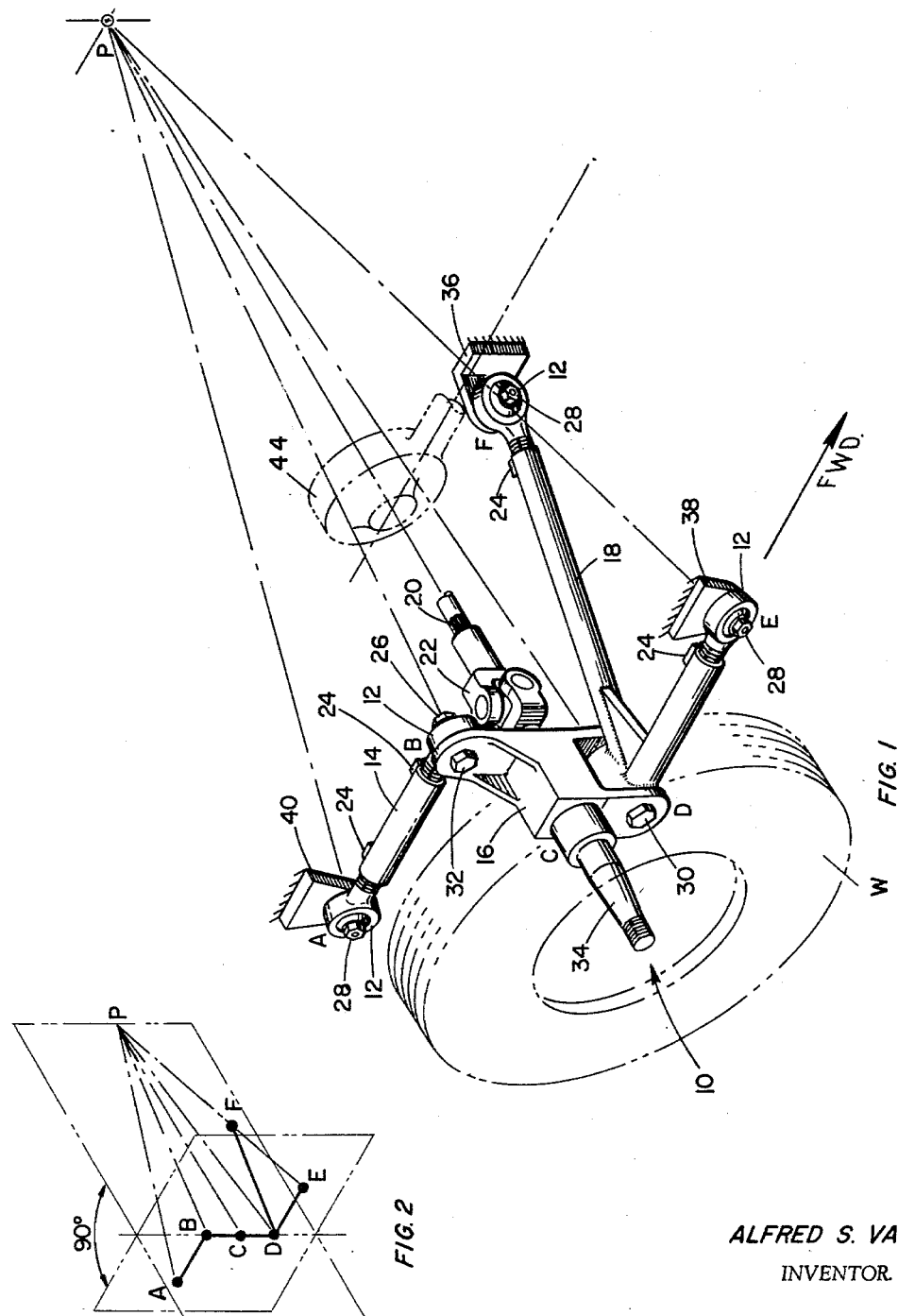
ALFRED S. VAIL
INVENTOR.
BY Walter G. Finch
ATTORNEY

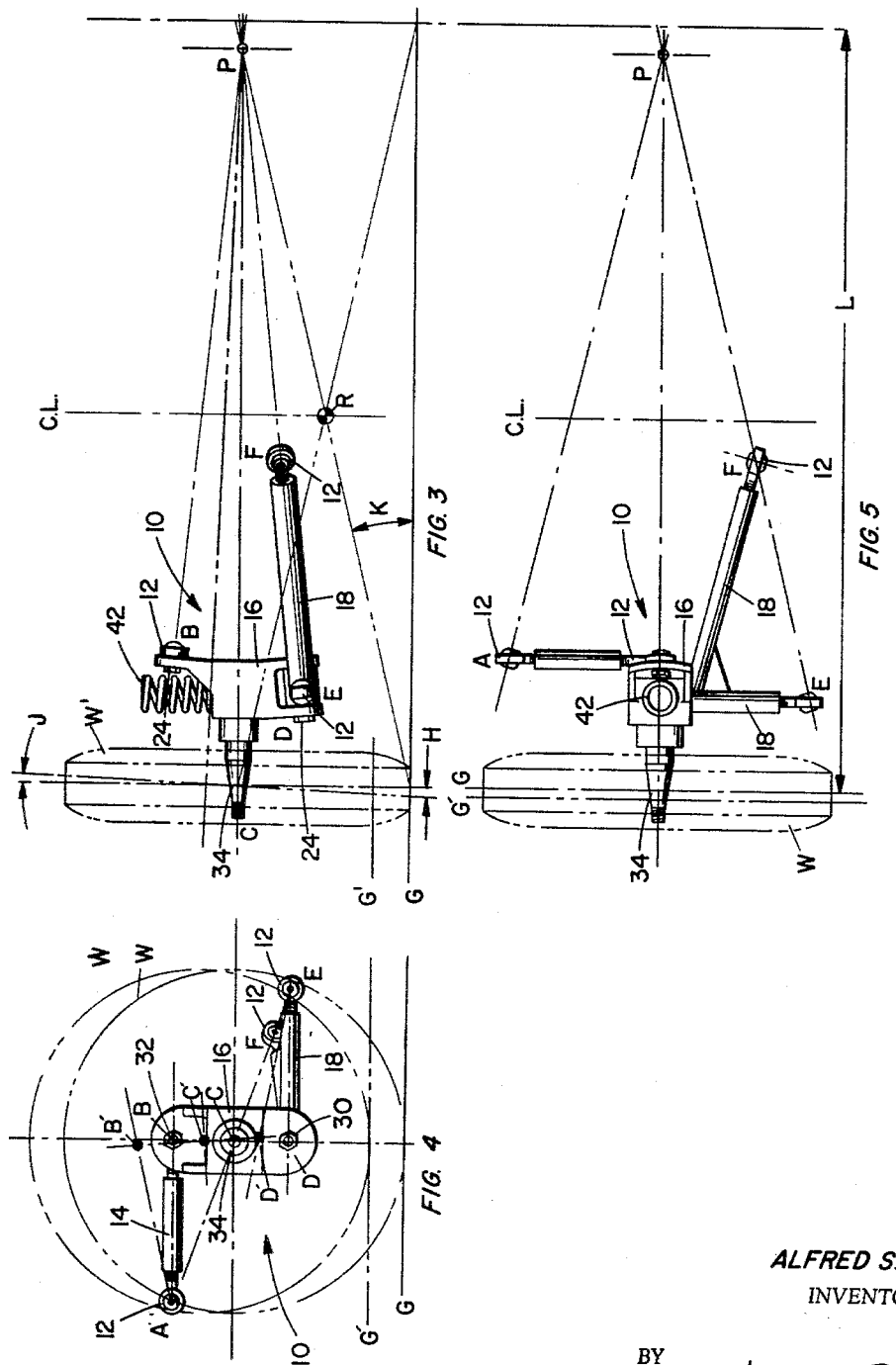

United States Patent Office 3,163,440
Patented Dec. 29, 1964

3,163,440
EXTENDED SWING RADIUS AUTOMOTIVE REAR AXLE SUSPENSION SYSTEM
Alfred S. Vail, 406 Stevenson Lane, Baltimore, Md.
Filed Oct. 3, 1962, Ser. No. 228,089
4 Claims. (Cl. 280—80)

This invention relates generally to land vehicles, and more particularly it pertains to a rear axle suspension system for automobiles.

Most conventional swing axles for automobiles pivot about an axis running through a point on the differential case and a point on the side frame rail of the vehicle. Vertical displacements of the wheel from the rigged position cause the wheel axis to move angularly so that it does not remain perpendicular to the line of motion in the plan view.

This castor angle results in drag and tire wear at any loading other than that which produces an axis perpendicular to the direction of motion. These conventional types of swing axles further produce an effect known as "rear end steering."

There have been some attempts to apply linkages known generally as "Watts' straight line motion" to eliminate the rear end steering. Such arrangements heretofore consisted of complicated systems of trusses which were difficult to align properly, and if not in true alignment would set up additional internal stresses.

The present invention uses the three dimensional Watts linkage (known as conical), which has been in public domain for several generations, to eliminate the rear end steering effect. The improvement over prior art comprises a simplified arrangement of links where only one member is triangulated and pivoted on a long base for stiffness. It contains a long axis stiff journal joint at the swinging end which controls the hub carrier in a manner to establish both castor and camber of the wheel, the third member, being ball ended, is free in the joint motion and is used only through the joint position and length of the member to control the motion of the hub carrier about the journal joint axis to establish the wheel axis in a fore and aft direction and thus establish Watts' geometry.

It is an object of the present invention to apply a conical Watts' linkage to the problem of an extended swing radius rear axle suspension to overcome change in castor angle and rear end steering of vehicles resulting from vertical deflection of the rear axle.

Another object of this invention is to provide a system to pivot a rear axle suspension so as to permit a lower roll center and thus produce a softer ride as a consequence of moving the pivot point of the suspension assembly to the opposite side of the vehicle or even to a point outside of the vehicle.

To provide greater tire life through the elimination of castor angle change and reduction of tire scrub due to tread change during deflection of a wheel suspension are yet other objects of this invention.

Still another object of the invention is to provide a three dimensional Watts' linkage for a driven rear wheel suspension where one member is a triangular truss pivoted on a long axis and whose swinging end contains a hub carrier controlling stiff journal joint, the third link being ball ended.

Other objects and attendant advantages of this invention will become more readily apparent and understood from the following detailed specification and accompanying drawings in which:

FIG. 1 is a perspective drawing of an improved rear axle suspension system for vehicles incorporating features of this invention and shown partially in schematic and partially in phantom;

FIG. 2 is a geometric diagram in three dimensions illustrating the novel suspension principle of this invention;

FIG. 3 is a vertical elevation viewed from the front of the vehicle showing the suspension system of FIG. 1;

FIG. 4 is a side view of the suspension system of this invention; and

FIG. 5 is a plan view of the suspension of FIG. 1.

The geometry of Watts' straight line mechanism is depicted in one plane of FIG. 2 in which lie points A, B, C, D, and E. Links AB and DE are equal in length and are parallel in the neutral or rigged position. Link BCD is shown as being perpendicular to AB and DE but may be rigged with a slightly acute angle to those links in a manner similar to the letter Z with the same result. The point C is the midpoint of link BCD.

When the link BCD is moved up or down, both links AB and DE move through an angle and the midpoint C moves up and down along a straight line.

If, in a plane at 90 degrees to the previously mentioned plane, a focal point P is selected on a line perpendicular to the latter and passing through point C, there is obtained a three dimensional linkage system of a conical type. This is because if the axis AP and EP are fixed, the lines BP and DP will generate elements of cones. The lines BP and DP also rotate about CP which may be considered the axis of a cone, so the joint axis BP and DP are generating elements common to two cones.

The point C will always swing in an arc about point P and will always lie in the vertical transverse plane, as long as the limits of the mechanism are not surpassed. If the axis CP is used as a wheel axis, the wheel will have no change in castor angle for changes in vertical displacement since CP always remains in the vertical transverse plane.

To control the attitude and stiffness of the entire linkage, the lower arm DE is made a truss EDF where point F is on the axis EP. Both points E and F are ball joint types of fixed pivots, and the point D is a journal joint whose pivot axis is DP.

The upper link AB may then be a single link with ball joints at each end although it could be another truss with a journal bearing point B. The use of a single link with ball joints at each end is more economical in cost and fabrication as it eliminates the redundancy problem of axis alignment in space for the non-parallel axis. The upper arm AB only controls the fore and aft movement of the point B to preserve the conical Watts' linkage geometry.

In the preferred embodiment of the invention as depicted in FIG. 1, the improved swing axle system is indicated generally by reference numeral 10. Three fixed chassis brackets 40, 38, and 36 are provided corresponding to the points A, E, and F, respectively, of the geometrical diagram, FIG. 2. Each bracket 40, 38, and 36 mounts a spherical bearing 12 on a bolt 28.

The geometric link BCD consists of a forged wheel carrier 16 whose upper end mounts another spherical bearing 12 on a bolt 32, corresponding to point B, and secured by a locknut 26. An upper control arm 14 joins this bearing 12 with the bearing 12 mounted on bracket 40.

The lower end of carrier 16 is bifurcated and arranged with a pivot bolt 30 on axis DP. This pivot bolt 30 engages a journal of a rigid truss 18 corresponding to the linkage EDF of the geometrical diagram of FIG. 2.

A wheel axle 34 on axis CP is journalled in the carrier 16 intermediate the upper and lower ends thereof and is provided with a universal joint 22 on its inner end. A splined shaft 20 is reciprocably received in this universal joint 22 and extends to another universal joint (not shown) of the vehicle differential 44.

Thus, the wheel axle 34 can be driven from the differential 44 as the wheel W moves up and down from road irregularities and, as previously explained, there will be no change in its castor angle.

The spherical bearings 12 are preferably threaded into their associated linkage for adjustment purposes and secured by bearing locks 24 as shown.

If another axis on carrier 16 parallel to CP is chosen for the wheel axle 34, there still will be no change in castor angle for vertical displacement as the plane of the wheel axis will always be parallel to the vertical transverse plane. There will, however, be a slight change in wheelbase since this new axis rotates slightly about CP as link BCD rotates with the vertical displacement.

The use of such a parallel axis to CP for a wheel axis will permit the point P to be lowered below the wheel axis 34 and closer to the ground.

Another approach to a lower pivot center P is accomplished by giving the wheel a negative camber by tilting the longitudinal plane slightly. As long as this plane is parallel to the direction of motion, there will be no change in castor angle.

FIG. 3 shows a spring perch for a coil spring 42, but with slight changes to flat stock in the links AB and the DE member of the lower truss 18 the novel geometry may easily be retained using torsion bars for both springing and roll control.

FIGS. 3, 4 and 5 illustrate the working of the extended swing radius suspension with movement of the wheel over a lump depicted by a ground line change from G to G'. Points B, C, and D displace, respectively, to B', C' and D'. It is to be noted the absence of castor angle, with the lines G and G' remaining parallel in FIG. 5.

Tire scrub H, it will be noted, is reduced as point P is moved away from the wheel W and disappears completely at infinity. The roll center R on the centerline CL of the vehicles is also lowered as point P is moved out and the scrub angle K is reduced.

Among other advantages the upper control arm 14 and rigid truss 18 are in a good position to absorb the stress loads imposed on them. For example, the braking load is absorbed as a force couple. Further, the appearance of the vehicle is improved since the wheel camber change J is reduced in proportion to the amount the swing radius is increased and roll center R lowers.

The good points of a swing axle are retained in this novel suspension, namely, the retention of a fixed position of the differential case and drive shaft so that the rear seat floor hump of the vehicle is greatly reduced. The transmission may also be moved back to be incorporated in the differential case to reduce front seat floor hump and to improve weight balance.

The long swing radius CP and resulting small scrub angle K reduce the changes in tread L (the distance from the ground contact point G of one wheel to that of the opposite wheel) when passing over bumps.

Obviously many modifications and variations of the present invention are possible in light of the above teachings. It is, therefore, to be understood that within the scope of the appended claims the invention may be practiced otherwise than as specifically described.

What is claimed is:

1. A wheel suspension linkage system for a vehicle, comprising an upper link, a lower link consisting of a rigid truss having a pair of angularly extending arms connected to a common journal, a wheel carrier having upper and lower carrier pivot means, said lower carrier pivot means consisting of a bifurcation of said wheel carrier, said upper link and one arm of said rigid truss extending in opposite directions and being of equal pivotal length, said upper link being pivotally joined to the upper end of said carrier by said upper carrier pivot means, said journal being journalled between said bifurcation of said wheel carrier, with upper, lower, and inwardly spaced pivot means for said vehicle, the oppositely extending end of said upper link and said one arm of said rigid truss being secured to said vehicle by said upper and lower chassis pivot means, respectively, the opposite end of the other arm of said rigid truss extending to a point adjacent to the center line of said vehicle and being secured thereat by said inwardly spaced chassis pivot means, said common journal and the proximity of said other arm of said truss to said center line providing stiffness to the assembly of said upper and lower links to said wheel carrier and to said vehicle, with said upper carrier pivot means and said lower carrier pivot means each being rotatable about a first axis and second axis, respectively, and with said first axis and said second axis each having a common focal point, whereby a wheel axle mounted on said carrier intermediate the ends thereof and having a wheel axis, said wheel axis of said wheel axle passes through said common focal point of said first axis and said second axis and moves only in a vertical plane which includes said common focal point.

2. A wheel suspension linkage system as recited in claim 1, wherein said upper carrier pivot means and all said chassis pivot means are spherical ball joint connections.

3. A wheel suspension linkage system for a vehicle, comprising an upper link, a lower link consisting of a pair of angularly extending arms having a substantially common junction to form a rigid truss, a wheel carrier having upper carrier pivot means and lower means for forming a journal connection with said common junction of said truss, said upper link and one arm of said rigid truss extending in opposite directions and being of equal pivotal length, said upper link being pivotally joined to the upper end of said carrier by said upper carrier pivot means, upper, lower, and inwardly spaced pivot means for said vehicle, the oppositely extending end of said upper link and of said one arm of said rigid truss being secured to said vehicle by said upper and lower chassis pivot means, respectively, the opposite end of the other arm of said rigid truss extending to a point adjacent to the center line of said vehicle and being secured thereat by said inwardly spaced chassis pivot means, said journal connection of said common junction and the proximity of said other arm of said truss to said center line providing stiffness to the assembly of said upper and lower links to said wheel carrier and to said vehicle, with said upper carrier pivot means and the lower means of said wheel carrier each being rotatable about a first axis and a second axis, respectively, and with said first axis and said second axis each having a common focal point, whereby a wheel axle mounted on said carrier intermediate the ends thereof and having a wheel axis, said wheel axis of said wheel axle passes through said common focal point of said first axis and said second axis and moves only in a vertical plane which includes said common focal point.

4. A wheel suspension linkage system as recited in claim 3, wherein said upper carrier pivot means and all said chassis pivot means are spherical ball joint connections.

References Cited by the Examiner

UNITED STATES PATENTS 2,775,467 12/56 Kraus et al. _____ 180—73 X
2,811,214 10/57 Uhlenhaut et al. _____ 180—73
2,911,052 11/59 Olley _____ 180—73

FOREIGN PATENTS 876,280 8/61 Great Britain.

PHILIP ARNOLD, *Primary Examiner.*

A. HARRY LEVY, *Examiner.*